United States Patent
Luger

(10) Patent No.: US 6,523,965 B1
(45) Date of Patent: Feb. 25, 2003

(54) DRIVER REARVIEW MIRROR

(76) Inventor: Paul P. Luger, N. 1107 Astor St., Spokane, WA (US) 99202

( * ) Notice: Subject to any disclaimer, the term of this patent is extended or adjusted under 35 U.S.C. 154(b) by 0 days.

(21) Appl. No.: 07/977,163

(22) Filed: Nov. 16, 1992

Related U.S. Application Data

(63) Continuation of application No. 07/706,201, filed on May 28, 1991, now abandoned.

(51) Int. Cl.[7] ................................................ G02B 5/08
(52) U.S. Cl. ........................ 359/850; 359/851; 359/866
(58) Field of Search .................. 359/850, 851, 359/843, 866, 854, 861, 864, 865, 868, 869

(56) References Cited

U.S. PATENT DOCUMENTS

| | | | | |
|---|---|---|---|---|
| 3,131,250 A | * | 4/1964 | Ely | 359/850 |
| 3,972,601 A | * | 8/1976 | Johnson | 359/866 |
| 4,182,552 A | * | 1/1980 | Feinbloom | 359/866 |
| 4,200,359 A | * | 4/1980 | Lawson | 359/850 |
| 5,044,739 A | * | 9/1991 | Santo | 359/866 |

FOREIGN PATENT DOCUMENTS

| | | | | |
|---|---|---|---|---|
| FR | 2331633 | * | 6/1974 | 359/866 |
| FR | 2441088 | * | 3/1976 | 359/866 |
| FR | 2701781 | * | 7/1978 | 359/866 |

* cited by examiner

Primary Examiner—Mohammad Sikder

(57) ABSTRACT

An improved rearview mirror for use on most types of motor vehicles (cars and trucks) includes two plane (flat) reflective surfaces held at an acute angle with respect to each other. One of these a principal reflecting surface used as the principal rearview mirror; and a second reflecting surface being oriented so as to provide a reflected image of traffic in the blind spot of the principal reflecting surface. This second reflecting surface called the blind-spot-mirror. A support structure holds the principle reflecting surface bound to the larger reflecting surface, the blind-spot-mirror. Although the blind-spot mirror is larger, only portions of it appear to the driver as it is mostly covered by the principal reflecting surface. The support structure between the two reflective surfaces has the shape of a wedge (one or more) necessary for maintaining the blind-spot-mirror at the proper angle so as to reflect blind-spot traffic to the eye of the driver. It is useful on close-to-the-street or high-above-the-street vehicles.

7 Claims, 5 Drawing Sheets

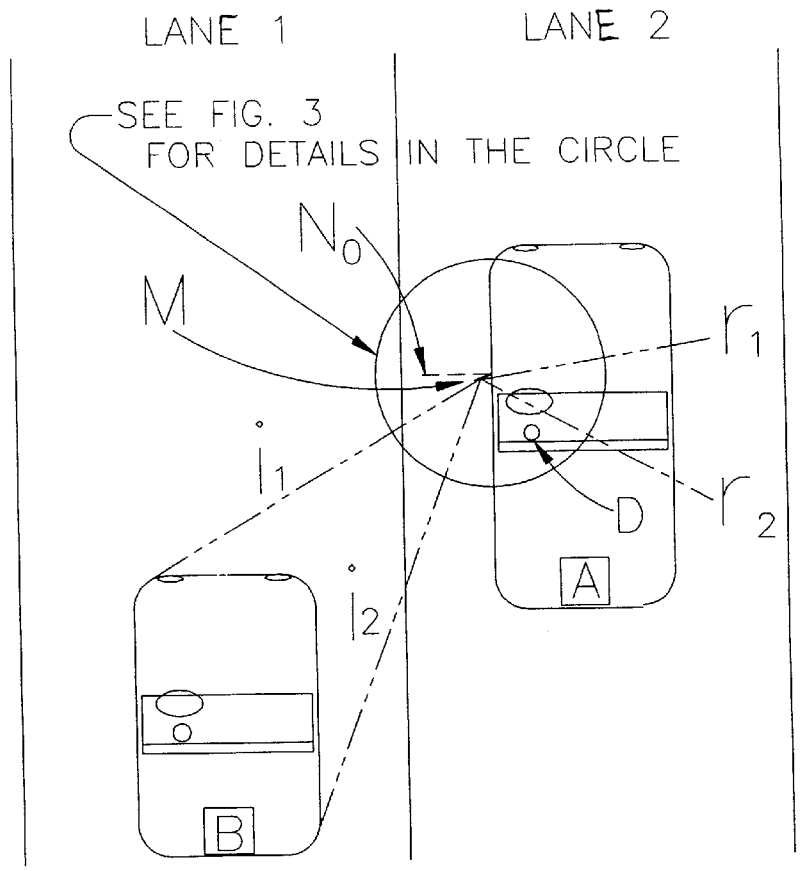
FIG. 1 (PRIOR ART)
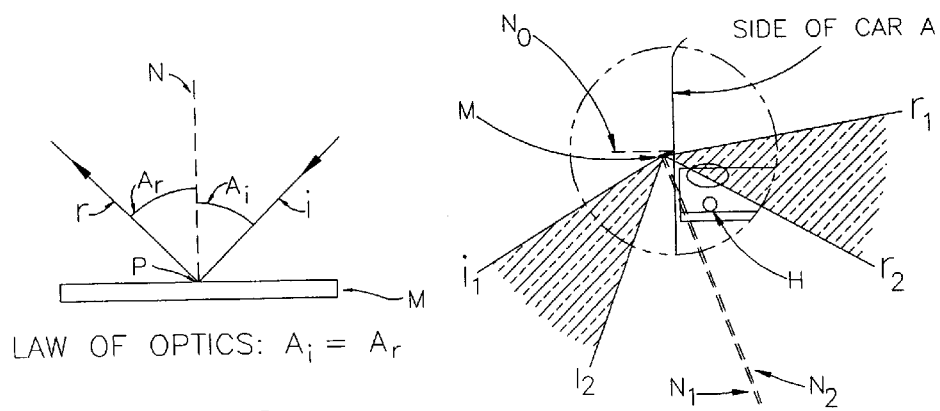
LAW OF OPTICS: $A_i = A_r$
FIG. 2
FIG. 3

EDGE VIEW OF FIG. 4

EXAMPLE OF PRIOR ART
EDGE VIEW OF MIRRORS

GEOMETRY OF SUPPORT STRUCTURE SS

DRIVER REARVIEW MIRROR

This is a continuation of application Ser. No. 07/706,201, filed May 28, 1991, now abandon.

BACKGROUND OF THE INVENTION

The invention especially concerns exterior rear-view mirrors on automobiles, trucks or other vehicles.

Presently the standard exterior rear-view mirrors offer the driver a rear-view on both sides of the vehicle without, however, completely eliminating the dead area in the field of vision.

To reduce this disadvantage that standard rear-view mirrors display, rear-view mirror have been built that reduce the dead area in the field of vision, whereby, in general, several mirrors are provided which bring to the driver's eyes zones whose angles vary with a functional dependence on the distance between the eyes and the mirror.

Thereby, when identical rear-view mirrors of the previously given type of construction are placed with respect to the driver sequentially at two different locations, for example, one on the right and the other on the left side of the vehicle, the angle of the visible zones in these identical rear-view mirrors is not the same and between these two zones a dead area in the field of vision can result which is dangerous.

The device in accordance with the invention allows these disadvantages to be corrected.

With the device in accordance with the invention the end effect makes it possible to conveniently place an exterior rear-view mirror of a construction type which reduces the dead area in the field of vision, regardless of whether on the right or the left of the vehicle, or a part on a standard exterior rear-view mirror and to so allow the later to be converted into an exterior rear-view mirror of a type reducing the dead area in the field of vision.

A realization of a rear-view mirror in accordance with the invention has at least one adjustable mirror dependent on the distance between the eye and the mirror.

In accordance with another characteristic feature of the invention the invention consists of a head which has several mirrors among which at least one is movable and can be adapted to a standard rear-view mirror or to the housing of a rear-view mirror of this type.

Another characteristic feature of the invention consists of an adjustable wedge which can be placed on a standard rear-view mirror, carries an adjustable mirror and allow the dead area in the field of vision to be reduced.

In accordance with another characteristic feature of the invention the attachable head is fasten to its seating surface by means of a latching device.

The figures included provide with non-limiting example forms of the invention several possibilities for the actualization of the invention.

BRIEF DESCRIPTION OF THE DRAWINGS

FIG. 1 shows in schematic form an example of an arrangement of the mirrors on a vehicle with respect to the steering rod.

FIG. 2 shows with a reduced scale a sectional view of a known rear-view mirror.

FIG. 3 shows in schematic form the field of vision with use of a rear-view mirror of the type shown in FIG. 2.

DETAILED DESCRIPTION OF THE DRAWINGS

As can be seen in FIG. 1, the exterior rear-view mirrors are placed with respect to the driver's eye represented with R on one and the same axis, which parallels an axis passing through R at interval e, as well as is found with respect to R at an interval 1 or L, and consequently is found on the driver's side or on the side opposite the driver's side.

Thereby, exterior rear-view mirror 1 of a known type, as shown, for example, in FIG. 2, has two mirrors with different dimensions, namely large mirror surface N, which is flat, and smaller mirror surface S, which is convex or flat and forms with mirror surface N a certain angle; according to whether it is placed on the driver's side or the side opposite the driver's side, this does not offer the same image of the field of vision.

As can be seen in FIG. 3, rear-view mirror 1 in accordance with FIG. 2 is, for example, placed on the driver's side, thus at interval 1; for mirror N field of view N and for mirror S field of view S results. As a consequence of both mirror surfaces it thus allows coverage of a field of view which corresponds to an angle $\alpha$.

When, on the other hand, the same rear-view mirror is on the side opposite the driver's side at interval L, the field of views visible with the help of the mirrors are designated as N' and S'.

The later zones N' and S' are smaller than zones N and S and enclose a non-visible zone M.

In an example case take a rear-view mirror in accordance with FIG. 2 and with $e$=455 mm $l$=710 mm $L$=1420 mm the angles have the following values:

angle of zone N=12°, angle of zone S=13°, which results in a total angle $\alpha$=N+S=25° and angle of zone N'=6°, angle of zone S'=10°30', angle of the non-visible zone=8°30', which results in a total angle $\alpha$'=N'+S+M=25°.

The invention has the goal of changing this angle $\alpha$' such that the angle of the non-visible zone M disappears, thus rotating zone S' until it borders zone N'.

Figure 4:
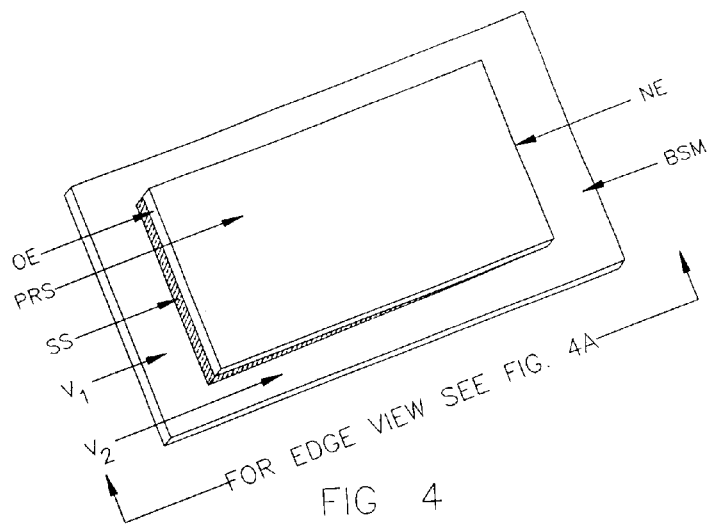
FIG. 4 shows a sectional view of a rear-view mirror in accordance with the invention placed on the driver's side.
Figure 4A:
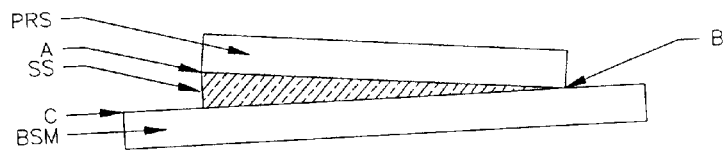
Figure 4B:
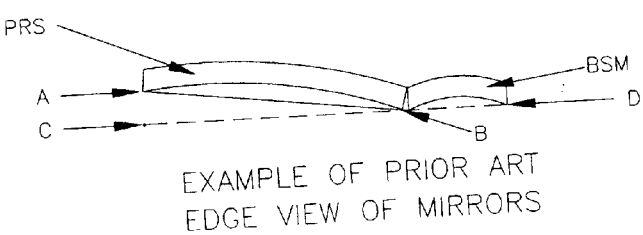
Figure 5:
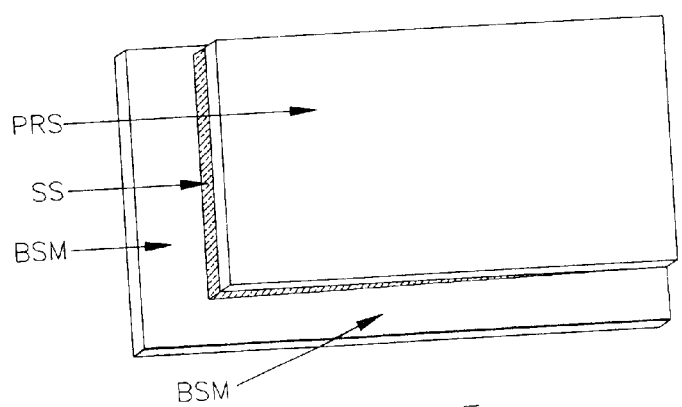
FIG. 5 shows a view corresponding to that in FIG. 4 of a rear-view mirror placed on the side opposite the driver's side.

The rear-view mirror 2 shown in FIGS. 4 and 5 characteristically consist of body 5 which carries mirrors 3 and 4 and is fastened to seating surface 13 by means of double-sided adhesive strip 12 or the like. Mirrors 3 and 4 are fastened to body 5 with the help of adhesive strips 6, 7, 14 and 15 and are separated from one another by shoulder 11. Body 5 carries on its part which accepts mirrors 3 and 4, recesses 8, 9 and 16 and has projection 10 between recesses 8 and 9.

In accordance with FIG. 4 mirror surface 4 of rear-view mirror 2 which corresponds to mirror surface N of rear-view mirror 1 in FIG. 2 is fastened to body 5 with the help of two double-sided adhesive strips 14 and 15 which are fastened for their part in the recesses 16 of body 5. Mirror 3 which corresponds to mirror S can be adjusted and is fasted by means of double-sided adhesive strips 6 and 7 to body 5 and to projecting part 10. Mirror 4 can likewise by adhesively fastened to body 5.

In accordance with FIG. 5 the side of mirror 2 opposite the driver's side must allow the angle of the non-visible zone M to be eliminated. To achieve this result, it is enough to enlarge the angle which mirrors 3 and 4 form with one another. Mirrors 3 and 4 are fastened for this purpose by means of double-sided adhesive strips 6 and 7 to body 5 and recesses 8 and 9, whereby the other components remain in the arrangement shown in FIG. 4.

Projecting part 10 can be replaced by one or more layers of double-sided adhesive strip or by one thicker strip.

In another example form of the invention mirror 4 can also be adjustable which involves the angle of inclination.

Figure 6:
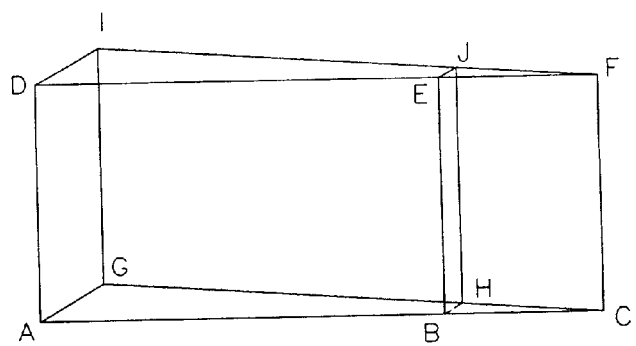
FIG. 6 shows a view of a head which can be placed on a standard rear-view mirror.

FIG. 6 shows in accordance with a modification of the invention a head 17 which can be placed on a standard rear-view mirror. This head 17 can be fastened to a standard rear-view mirror, for instance, through placement of double-sided adhesive strips between them or otherwise through adhesion. It can characteristically have the same form as body 5 and have the same construction elements as the rear-view mirror described further above. The attachable head can likewise adhere on a base which for its part adheres on the housing element of an already present rear-view mirror.

Figure 7:
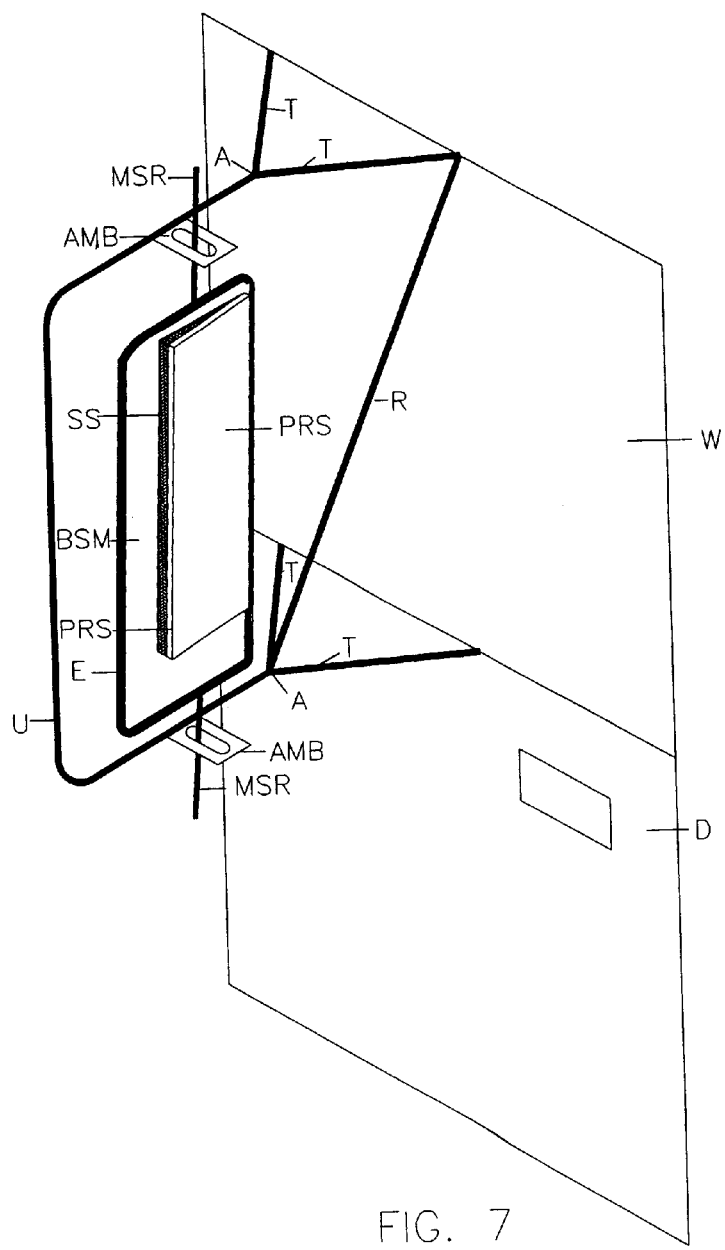
FIG. 7 shows a sectional view of an adjustable wedge in accordance with the invention which is placed on a rear-view mirror on the driver's side.
Figure 8:
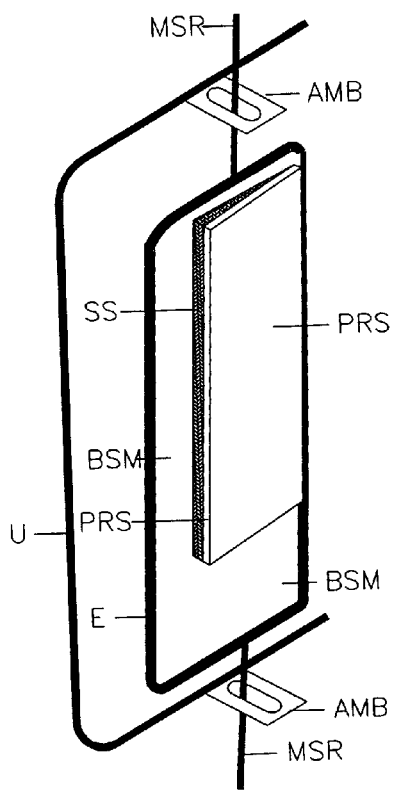
FIG. 8 is a sectional view of the same adjustable wedge on a rear-view mirror which is placed on the side opposite the driver's side.

The invention has as a subject an adjustable wedge shown both in FIGS. 7 and 8 which can be attached to a standard rear-view mirror. This adjustable wedge 18 which is fastened through adhesion by means of double-sided adhesive strip 21 or through any other means to mirror surface 19 of rear-view mirror 20 is characteristically formed from body 22 which, for example, consists of plastic or a similar material and mirror 27. Body 22 has on its part adhering to the rear-view mirror recess 29 on which one side 21 of the double-sided adhesive strip adheres. On its other side body 22 has two recesses 24 and 28 which are separated by a middle projecting part 23. Mirror 27 of adjustable wedge 18 is fastened to body 22 by means of two double-sided adhesive strips 25 and 26.

In accordance with a device in accordance with the invention the driver thus has available with identical rear-view mirrors two fields of view, whereby one of these zones corresponds to an image supplied by mirror 19 of rear-view mirror 20, while the other corresponds to an image which is supplied by mirror 27 of adjustable wedge 18.

Since these fields of view change depending on the distance of the driver from the rear-view mirror, care must be taken to be able to change the angle that mirror 27 makes with mirror 19.

To guarantee a maximal view to the rear of the vehicle this angle must equal $\alpha_1$, and thus be relatively large, as is shown in FIG. 7 for the case in which the rear-view mirror is found laterally near the driver, thus at a small distance from the driver. In this case double-sided adhesive strip 25 is placed on middle projecting part 23 and double-sided adhesive strip 26 on recess 28; mirror 27 then adheres via these two strips.

When in comparison the rear-view mirror is on the side opposite the driver's side, thus at a large distance from the driver, angle $\alpha_1'$, as is shown in FIG. 8, must be relatively small. To obtain this angle $\alpha_1'$ of mirror 27 with respect to mirror 19, double-sided adhesive strip 26 is again placed in recess 28, but double-sided adhesive strip 25 is placed in recess 24. With these two adhesive strips 25 and 26, mirror 27 then adheres.

The rear-view mirror which is thus held can be used independently of whether it is found on the driver's side or the side opposite the driver's side, whereby the only condition is that mirror 27 with bevel 18 is adjusted beforehand depending on the side of use.

Body 22 with bevel 18 can also be fastened with means other than double-sided adhesive strips, such as, for example, similar adhesive means.

Middle projecting part 23 of this body 22 can be similarly replaced with a second thickness of double-sided adhesive strip.

Figure 9:
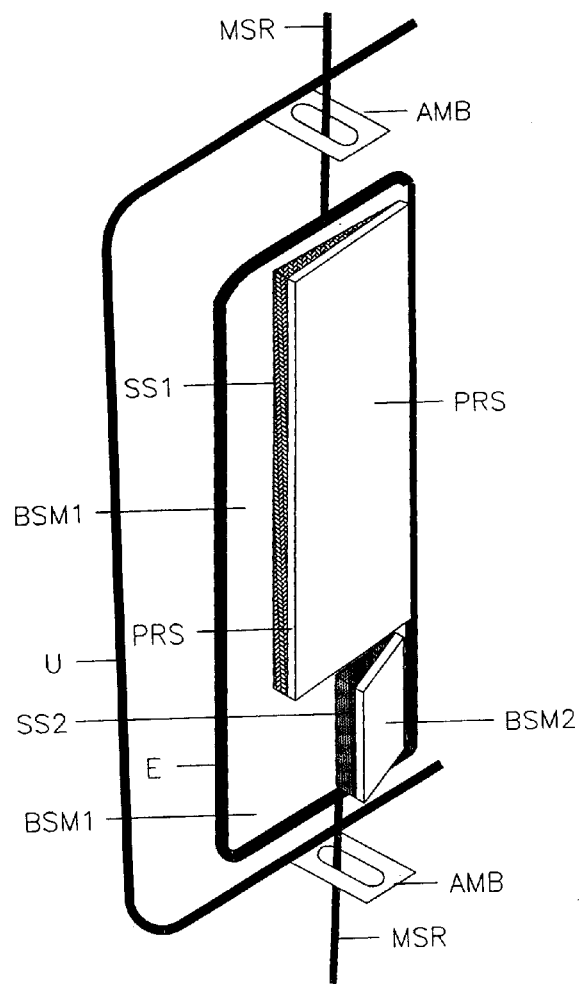
FIG. 9 shows in a sectional view a quick fastening system for the head which accordingly can be placed on a seating surface using a latching device.
Figure 10:
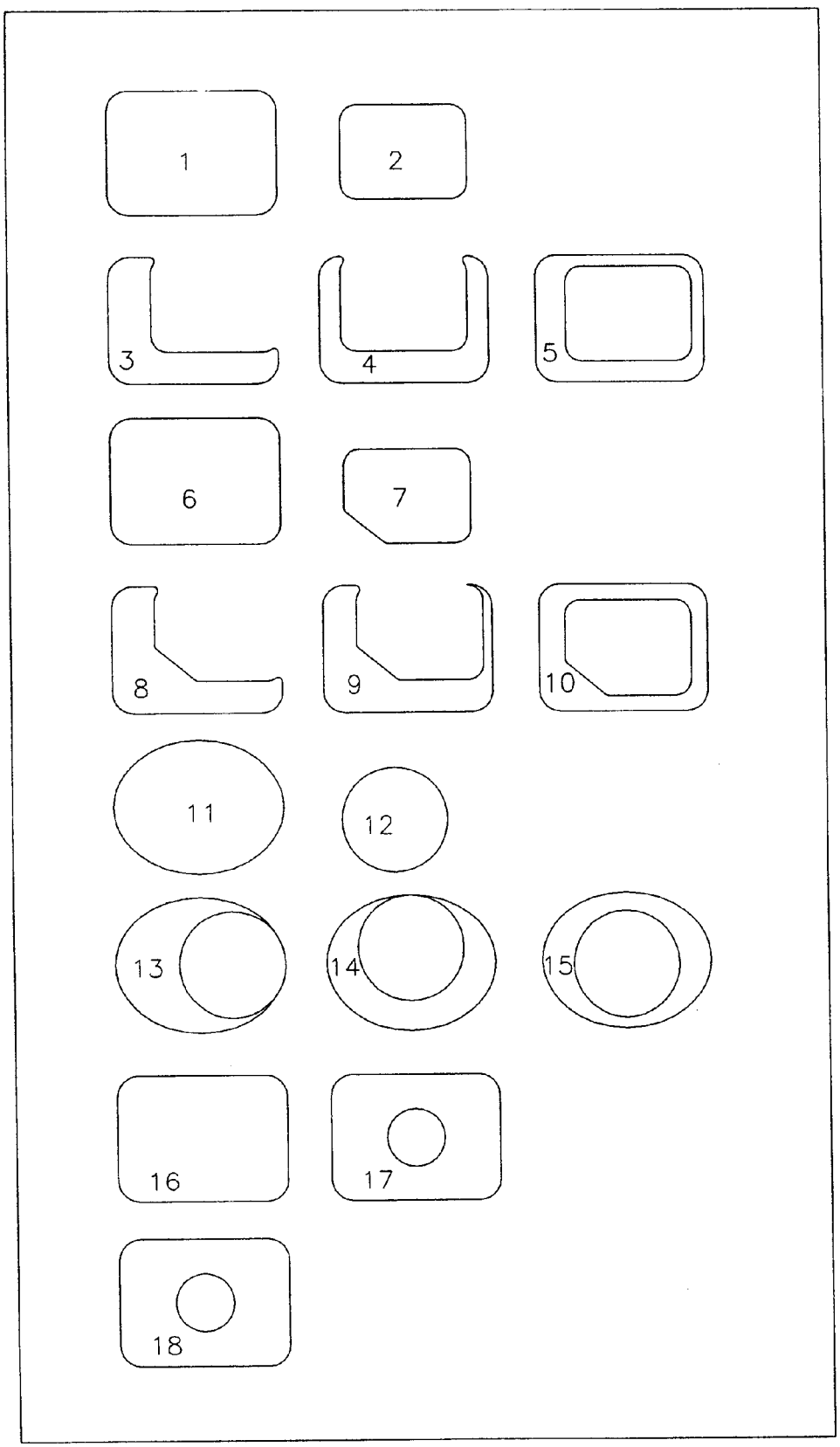
FIG. 10 shows a plan view of a socket with which the attached head is latched.

The invention further has as an object, a system shown in FIGS. 9 and 10 for latching [translator's note: illegible word] head 17 attachable to standard rear-view mirror 31 with use of socket 32. Head 17 is placed in socket 32 with the help of at least two supporting projections 33 which reach into notched slits 34 of the socket. These notched slits 34 have section 35 with a diameter which is slightly larger than the diameter of the head of supporting projection 33 and further have section 36 whose width is somewhat larger than the diameter of the supporting projection pin.

The placement of attachable head 27 in socket 32 occurs with the head of the supporting projections being introduced into holes 35 of notched slits 34 and by head 17 and thereby head 33 of the supporting projections being turned until the later is found against base 36 of notched slit 34. The locking into position of the head is achieved by means of one or more springs 37. The fastening of socket 32 to rear-view mirror 31 or to its housing occurs by means of double-sided adhesive strips, through adhesive or by any other means.

The invention is used in the area of outfitting automobiles, trucks or the like.

It is understood that the invention is not limited to the art and manner described and shown in the included figures. Instead, modifications remain possible, especially concerning construction, without leaving the protected range of the invention.

What is claimed is:

1. A rearview mirror for a vehicle comprising:

A principle mirror providing a driver a view of objects in a view area in a lane adjacent to the vehicle and excluding a view of objects in a blind spot in the lane adjacent and to the rear of the vehicle;

A blind spot mirror providing the driver the view of objects in the blind spot of the principle mirror;

A frame supporting said blind spot mirror and attached to a side of the vehicle;

A wedge securing said principle mirror to said blind spot mirror; said wedge tapering from a wide edge to a thin edge;

said thin edge being mounted to point generally inward toward the front and opposite side of the vehicle;

said wedge having a first surface and a second surface;
said blind spot mirror rigidly attached to said first surface and said principle mirror rigidly attached to said second surface;
said first and second surfaces forming a fixed wedge angle therebetween; said fixed wedge angle being such as to reflect to the driver the view of objects in the blind spot when said principle mirror is positioned to view objects in said view area.

2. The rearview mirror of claim 1, wherein:
said principle mirror including a principle reflector surface being substantially planar.

3. The rearview mirror of claim 1, wherein:
said blind spot mirror including a blind spot reflector surface being substantially planar.

4. The rearview mirror of claim 1, wherein:
said principle mirror including a principle reflector surface;
said blind spot mirror including a blind spot reflector surface;
said principle reflector surface having a total surface area which is smaller than said blind spot reflector surface.

5. The rearview mirror of claim 1, wherein:
said principle mirror including a principle reflector surface;
said blind spot mirror including a blind spot reflector surface;
said blind spot reflector surface having a total surface area which is larger than said principle reflector surface.

6. The rearview mirror of claim 5, wherein:
the first surface of said wedge is rigidly attached to said blind spot reflector surface.

7. The rearview mirror of claim 5, wherein the blind spot includes a first proximate blind spot area and a second distal blind spot area; said fixed wedge angle being such as to reflect to the driver the view of objects in the first proximate blind spot area; and further comprising:

A second blind spot mirror;

A second wedge securing said second blind spot mirror to said blind spot mirror; said second wedge tapering from a wide edge to a thin edge;
said thin edge of said second wedge being mounted to point generally inward toward the front and opposite side of the vehicle;
said second wedge having a first surface and a second surface; said blind spot mirror rigidly attached to said first surface of said second wedge and said second blind spot mirror rigidly attached to said second surface of said second wedge;
said first and second surfaces of said second wedge forming a second fixed wedge angle therebetween; said second fixed wedge angle being such as to reflect to the driver the view of objects in the distal blind spot area when said principle mirror is positioned to view objects in said view area.

* * * * *